May 13, 1924.
A. J. BUDLER
TIRE CHAIN CONNECTER
Filed Dec. 1, 1923
1,494,214
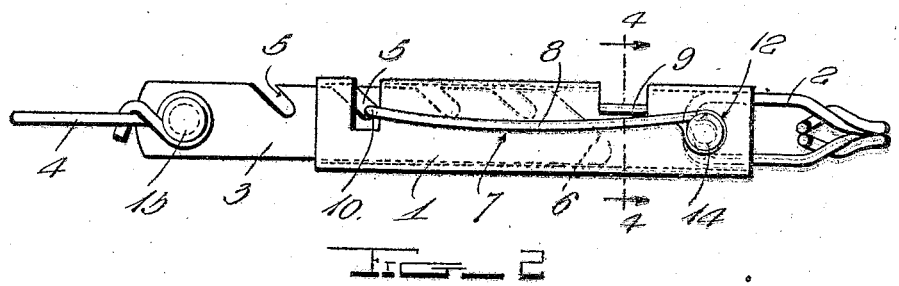
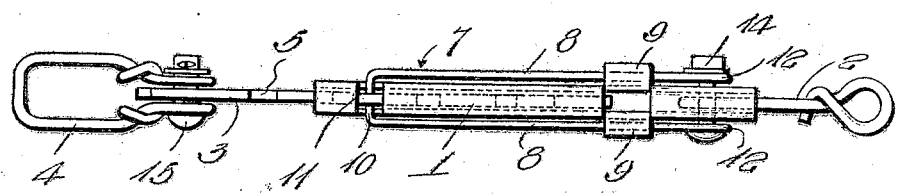
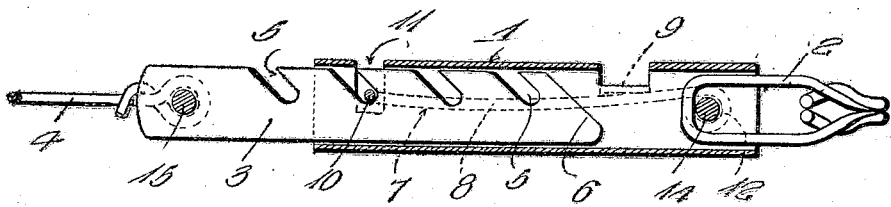
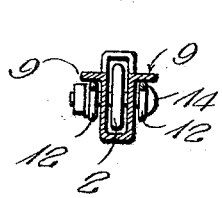
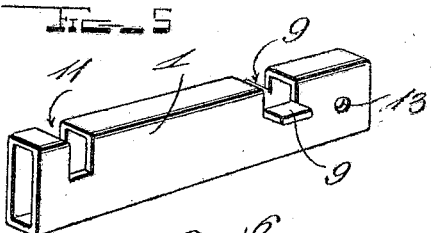
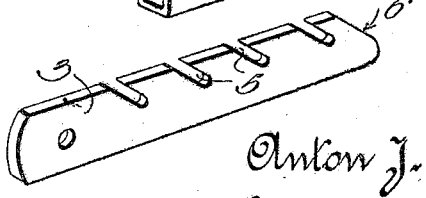
Inventor
Anton J. Budler
By H. B. Wilson &co
Attorneys
Witness Patented May 13, 1924.

1,494,214

UNITED STATES PATENT OFFICE.

ANTON J. BUDLER, OF FAIRMONT, NEBRASKA.

TIRE-CHAIN CONNECTER.

Application filed December 1, 1923. Serial No. 678,069.

*To all whom it may concern:*

Be it known that I, ANTON J. BUDLER, a citizen of the United States, residing at Fairmont, in the county of Fillmore and State of Nebraska, have invented certain new and useful Improvements in Tire-Chain Connecters; and I do declare the following to be a full, clear, and exact description of the invention, such as will enable others skilled in the art to which it appertains to make and use the same.

My invention relates to connecting devices for the ends of tire chains, the object being to provide a simple and inexpensive device which may be quickly and easily fastened or unfastened, and will tightly hold the chain on an automobile tire.

With the foregoing in view, the invention resides in the novel subject matter hereinafter described and claimed, the description being supplemented by the accompanying drawing.

Figure 1 is a side elevation.

Figure 2 is an edge view.

Figure 3 is a central longitudinal section, partly in elevation.

Figure 4 is a transverse sectional view on line 4—4 of Fig. 1.

Figure 5 is a perspective view of the tube which is carried by one end of the tire chain.

Figure 6 is a perspective view of the bar receivable in the tube and carried by the other end of the chain.

The form of construction selected for illustration in the present application, comprises a one-piece metal tube 1 which is open at both ends and is preferably of the flat formation shown. One end of this tube is adapted for connection with one of the endmost links 2 of a tire chain, while a bar 3 (preferably flat) is adapted to be connected with the other end link 4, said bar being insertible into the tube 1 and having at least one notch 5, but being preferably provided with a plurality of such notches. The end of the bar 3 to first enter the tube 1, is preferably beveled as indicated at 6, and the side walls of the notches 5, are shown parallel with said beveled end, these details being provided for a purpose to hereinafter appear.

An elongated, U-shaped, spring yoke 7 straddles the tube 1 and its arms 8 extend longitudinally along the side walls of said tube, to which walls said arms are connected at their free ends. At points adjacent such free ends, the arms 8 contact with laterally extending lugs 9 carried by the tube 1, said lugs being preferably formed by cutting and outwardly bending portions of the side walls of said tube. The bight portion 10 of the yoke 7 is co-operable with the notch or notches 5, as will be clear by reference to Figs. 1, 2 and 3, and it is to be observed that the arms 8 are held under tension by engagement with the lugs 9, so as to hold said yoke engaged with the proper notch.

In the preferred form of construction, the end of the tube 1, remote from the lugs 9, is formed with a notch 11 which opens through one of its edge walls and through both of its side walls, and the bight portion 10 of the yoke 7, is received in this notch and extends across the interior of the tube. Thus, when the bar 3 is forced into the tube, its beveled end 6 engages the bight portion 10 and springs the yoke out of the path of the ingoing bar. Then, as soon as one of the notches 5 comes opposite the bight portion 10, the latter will snap into said notch. If a plurality of these notches are used, it will be seen that due to their inclined formation, the bar 3 may be forced further inward after engagement of the portion 10 of the yoke 7, with one of said notches. Thus, the tire chain may be tightened to any desired extent.

In constructing the yoke 7, I in most instances make use of a single length of spring wire and form the free ends of the arms 8, with eyes 12 to aline with openings 13 in one end of the tube 1, said eyes and openings receiving a bolt or other fastener 14 which thus secures the arms and tube together and may also pass through the link 2, inserted into the end of the tube.

A suitable detachable fastener 15 is by preference employed to connect the link 4 with the bar 3, so that by disconnecting said link from the bar, one or more links may be removed from the tire chain, to take up any undesirable slack.

From the foregoing, taken in connection with the accompanying drawing, it will be seen that a simple and inexpensive device has been provided for connecting the ends of a tire chain or for analogous purposes, and it will also be observed that regardless of its simple and inexpensive construction, the device is exceptionally efficient and desirable. As excellent results may be obtained from the details disclosed, they are preferably followed, but within the scope of the invention as claimed, numerous changes may be made. In using the improved devices on tire chains, it is of course understood that one of them is employed in connection with each side chain.

I claim:

1. A tire chain connecter comprising an elongated tube adapted at one end for connection to one end of a chain, a bar insertible into the other end of said tube and having at least one notch in one of its edges, said bar being adapted for connection to the other end of the chain, an elongated U-shaped spring yoke whose bight portion is receivable in said notch, said yoke straddling said tube and having its ends connected therewith adjacent said one end thereof, and lateral projections on the sides of said tube engaging the arms of said yoke to hold them under tension.

2. A tire chain connecter comprising an elongated tube adapted at one end for connection to one end of a chain, the other end of said tube having a laterally opening notch, an elongated U-shaped spring yoke whose bight portion is received in said notch and extends across the interior of said tube, said yoke straddling said tube and having its ends connected with the latter at said one end thereof, lugs extending laterally from said tube and engaging the arms of said yoke to hold them under tension, and a bar insertible into the notched end of said tube and adapted for connection with an end of the chain, said bar having a beveled end to engage and laterally spring the bight portion of the aforesaid yoke and having at least one notch to receive said bight portion.

3. A tire chain connecter comprising an elongated open-ended flat tube having a notch opening through one of its edge walls and both of its side walls at one end thereof, the other ends of said side walls having alined openings and having outwardly bent lugs in inwardly spaced relation with said openings, a one-piece elongated spring wire yoke whose bight portion is received in the aforesaid notch and extends across the interior of the tube, the arms of said yoke extending longitudinally along the side walls of said tube, engaging said lugs and having eyes at their free ends alined with the aforesaid openings, a fastener passing through said openings and eyes and adapted also for passage through one end link of a chain when such link is inserted in one end of the tube, and a flat bar adapted for connection with the other end link of the chain and insertible into the notched end of the tube, said flat bar having a beveled end to engage and laterally spring the bight portion of the aforesaid yoke and having at least one notch to receive said bight portion.

In testimony whereof I have hereunto affixed my signature.

ANTON J. BUDLER.